(12) United States Patent
Wei (10) Patent No.: US 11,604,750 B2
(45) Date of Patent: Mar. 14, 2023

(54) PRODUCTION LINE TEST METHOD, SYSTEM AND DEVICE FOR PCIE SWITCH PRODUCT, AND MEDIUM

(71) Applicant: ZHENGZHOU YUNHAI INFORMATION TECHNOLOGY CO., LTD., Henan (CN)

(72) Inventor: Wenxing Wei, Henan (CN)

(73) Assignee: ZHENGZHOU YUNHAI INFORMATION TECHNOLOGY CO., LTD., Henan (CN)

( * ) Notice: Subject to any disclaimer, the term of this patent is extended or adjusted under 35 U.S.C. 154(b) by 0 days.

(21) Appl. No.: 17/042,970

(22) PCT Filed: Dec. 26, 2018

(86) PCT No.: PCT/CN2018/123677
§ 371 (c)(1),
(2) Date: Sep. 29, 2020

(87) PCT Pub. No.: WO2020/000955
PCT Pub. Date: Jan. 2, 2020

(65) Prior Publication Data
US 2021/0056061 A1 Feb. 25, 2021

(30) Foreign Application Priority Data

Jun. 29, 2018 (CN) .......................... 201810697736.7

(51) Int. Cl.
*G06F 13/00* (2006.01)
*G06F 13/40* (2006.01)
*G06F 13/42* (2006.01)

(52) U.S. Cl.
CPC ...... *G06F 13/4022* (2013.01); *G06F 13/4221* (2013.01); *G06F 2213/0026* (2013.01)

(58) Field of Classification Search
CPC ................. G06F 13/00; G06F 13/4022; G06F 13/4221; G06F 2213/0026
See application file for complete search history.

(56) References Cited

U.S. PATENT DOCUMENTS

| 9,727,510 B2 | 8/2017 | Edvenson et al. |
| 2014/0112131 A1* | 4/2014 | Todaka ............... H04L 47/2441 370/230 |

(Continued)

FOREIGN PATENT DOCUMENTS

| CN | 102866948 A | 1/2013 |
| CN | 104753720 A | 7/2015 |

(Continued)

OTHER PUBLICATIONS

International Search Report for PCT/CN2018/123677 dated Mar. 28, 2019, ISA/CN.

*Primary Examiner* — Henry Tsai
*Assistant Examiner* — Kim T Huynh
(74) *Attorney, Agent, or Firm* — Yue (Robert) Xu; Apex Attorneys at Law, LLP (57) ABSTRACT

A production line test method, system and device for a PCIE Switch product, and a medium. The method comprises: connecting to ports of a target PCIT Switch product using cables according to a preset rule, and controlling a target configuration file to run using a target controller such that the target PCIE Switch product enters a test state, wherein the target configuration file is a file pre-stored in the target PCIE Switch product, and the target controller is a controller pre-connected to the target PCIE Switch product; reading the current running information of the target PCIE Switch product and determining whether the current running information satisfies a preset condition; and if yes, determining that a production line of the target PCIE Switch product is (Continued)

normal. Hence, the method can greatly improve the test efficiency of a production line of a target PCIE Switch product.

7 Claims, 6 Drawing Sheets

(56) References Cited

U.S. PATENT DOCUMENTS

2017/0011002 A1 1/2017 Shin
2017/0052841 A1* 2/2017 Ogino ................. G06F 11/0745

FOREIGN PATENT DOCUMENTS

| | | |
|---|---|---|
| CN | 105260281 A | 1/2016 |
| CN | 105354162 A | 2/2016 |
| CN | 105490874 A | 4/2016 |
| CN | 105718346 A | 6/2016 |
| CN | 106294222 A | 1/2017 |
| CN | 106649014 A | 5/2017 |
| CN | 108052428 A | 5/2018 |
| CN | 108090006 A | 5/2018 |
| KR | 20180025481 A | 3/2018 |
| TW | 201802697 A | 1/2018 |

* cited by examiner

PRODUCTION LINE TEST METHOD, SYSTEM AND DEVICE FOR PCIE SWITCH PRODUCT, AND MEDIUM

The present application is the national phase of International Patent Application No. PCT/CN2018/123677, titled "PRODUCTION LINE TEST METHOD, SYSTEM AND DEVICE FOR PCIE SWITCH PRODUCT, AND MEDIUM", filed on Dec. 26, 2018, which claims the priority to Chinese Patent Application No. 201810697736.7, titled "PRODUCTION LINE TEST METHOD, SYSTEM AND DEVICE FOR PCIE SWITCH PRODUCT, AND MEDIUM", filed on Jun. 29, 2018 with the National Intellectual Property Administration, PRC, both of which are incorporated herein by reference in their entireties.

FIELD

The present disclosure relates to the technical field of servers, and in particular, to a method, a system and a device for detecting a production line of PCIE Switch products, and a medium.

BACKGROUND

Figure 1:
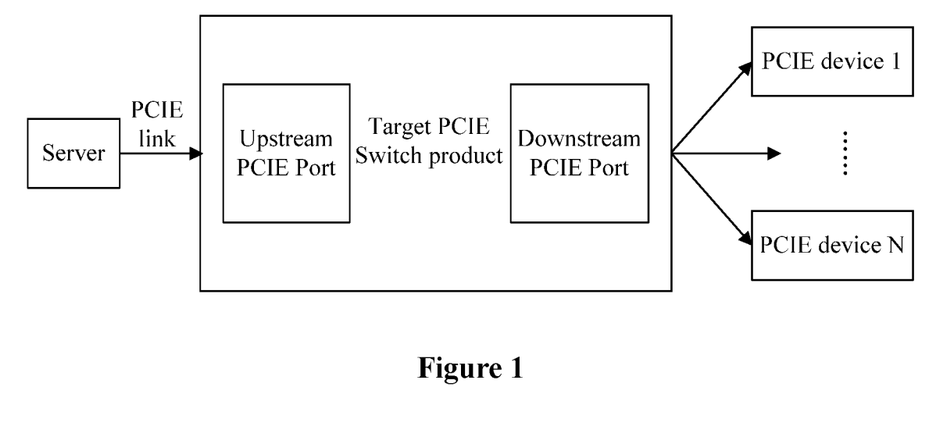
FIG. 1 is a schematic diagram illustrating an arrangement for detecting a production line of PCIE Switch products in the conventional technology.

With the rapid development of Internet technology, the demand for servers is increasing. In order to meet complex demands, a PCIE Switch product may meet business demands in different scenarios by changing configuration files in a chip, so there are more and more PCIE Switch products are developed to expand functions of conventional servers. As shown in FIG. 1, which is a schematic diagram illustrating an arrangement for detecting a PCIE Switch product in the conventional technology, in order to detect the PCIE Switch product, it is required to connect an upstream PCIE Port of the PCIE Switch product to a server through a PCIE link, and connect a downstream PCIE Port of the PCIE Switch product to a PCIE device. After all devices are connected together, it is determined whether the PCIE Switch product can be mounted with the PCIE device, whether a bandwidth of the PCIE device is consistent with a rate set in a configuration file, or whether a rate of the PCIE device reaches a preset rate. However, in this method, it is required to assemble the PCIE Switch product and connect the PCIE Switch product to the server, to check whether the state, the bandwidth and the rate of the mounted PCIE device are normal under BIOS or OS. If detection requirement changes, it is required to assemble the PCIE Switch product in the above way again to detect the PCIE Switch product, which seriously affects the detection efficiency of the production line of PCIE Switch products. Therefore, a problem urgently to be solved by those skilled in the art is how to improve the efficiency in detecting the production line of PCIE Switch products.

SUMMARY

In view of the above, a method, a system and a device for detecting a production line of PCIE Switch products, and a medium are provided according to the present disclosure, to improve the efficiency of detecting a production line of PCIE Switch products. Detailed technical solutions are described as follows.

A method for detecting a production line of PCIE Switch products is provided according to the present disclosure, which includes:

connecting ports of a target PCIE Switch product via cables according to a preset rule;

controlling a target configuration file to run by a target controller, to operate the target PCIE Switch product in a detection state, where the target configuration file is pre-stored in the target PCIE Switch product, and the target controller is connected to the target PCIE Switch product in advance;

acquiring current operation information of the target PCIE Switch product, and determining whether the current operation information meets a preset condition; and determining that a production line of the target PCIE Switch product operates normally if the current operation information meets the preset condition.

Preferably, the connecting ports of a target PCIE Switch product via cables according to a preset rule includes:

connecting a port port0, a port port1, and a port port2 of the target PCIE Switch product respectively to a port port5, a port port4, and a port port3 of the target PCIE Switch product via the cables.

Preferably, the connecting ports of a target PCIE Switch product via cables according to a preset rule includes:

connecting the ports of the target PCIE Switch product via PCIE cables each with an Oculink connector according to the preset rule.

Preferably, the determining that a production line of the target PCIE Switch product operates normally if the current operation information meets the preset condition includes:

determining that the production line of the target PCIE Switch product operates normally if the current operation information meets the preset condition, and controlling a target display to display according to a preset display rule, where the target display is arranged on the target PCIE Switch product in advance.

Preferably, the controlling a target configuration file to run by a target controller, to operate the target PCIE Switch product in a detection state includes:

controlling the target configuration file to run by using a switch of the target controller, to operate the target PCIE Switch product in the detection state.

Preferably, the switch is a physical switch or a software switch.

Preferably, the acquiring current operation information of the target PCIE Switch product includes:

acquiring a current connection state and/or a current bandwidth and/or a current rate of the target PCIE Switch product by the target controller.

A system for detecting a production line of PCIE Switch products is further provided according to the present disclosure, which includes a production line detection module, an information acquisition module and a production line determination module. The production line detection module is configured to connect ports of a target PCIE Switch product via cables according to a preset rule, and control a target configuration file to run by a target controller, to operate the target PCIE Switch product in a detection state, where the target configuration file is pre-stored in the target PCIE Switch product, and the target controller is connected to the target PCIE Switch product in advance. The information acquisition module is configured to acquire current operation information of the target PCIE Switch product, and determine whether the current operation information meets a preset condition. The production line determination module is configured to determine that a production line of the target PCIE Switch product operates normally if the current operation information meets the preset condition.

A computer-readable storage medium is further provided according to the present disclosure, which includes a computer program stored thereon. The computer program, when being executed by a processor, causes the processor to perform steps of the above described method for detecting a production line of PCIE Switch products.

A device for detecting a production line of PCIE Switch products is further provided according to the present disclosure, which includes a memory and a processor. The memory is configured to store a computer program, and the processor is configured to execute the computer program to perform the steps of the above method for detecting a production line of PCIE Switch products.

In the present disclosure, a set target configuration file is stored in a target PCIE Switch product in advance, and the target PCIE Switch product is connected to a target controller. Ports of the target PCIE Switch product are connected via cables according to a preset rule. The target configuration file in the target PCIE Switch product is controlled to run by a target controller, to operate the target PCIE Switch product in a detection state. When the target PCIE Switch product operates in the detection state, current operation information of the target PCIE Switch product is acquired by the target controller. The current operation information of the target PCIE Switch product is compared with a preset condition, and it is determined that a production line of the target PCIE Switch product operates normally if a determination result meets the preset condition. As can be known, in the conventional method, the target PCIE Switch product needs to be connected to a server, the target PCIE Switch product and PCIE devices mounted thereon are reassembled repeatedly, and it is required to determine whether the production line of the target PCIE Switch product operates normally under Bios or OS. Compared with the conventional method, with the method according to the present disclosure, the efficiency in detecting the production line of the target PCIE Switch product can be greatly improved. Correspondingly, the system and the device for detecting a production line of PCIE Switch products, and the medium according to the present disclosure also have the above beneficial effects.

BRIEF DESCRIPTION OF THE DRAWINGS

In order to more clearly illustrate technical solutions in embodiments of the present disclosure or the conventional technology, drawings used in the description of the embodiments or the conventional technology are described briefly hereinafter. Apparently, the drawings described in the following illustrate some embodiments of the present disclosure, other drawings may be obtained by those ordinarily skilled in the art based on these drawings without any creative efforts.

DETAILED DESCRIPTION OF EMBODIMENTS

The technical solutions in the embodiments of the present disclosure will be described clearly and completely hereinafter in conjunction with the drawings in the embodiments of the present disclosure. Apparently, the described embodiments are only a part of the embodiments of the present disclosure, rather than all embodiments. Based on the embodiments in the present disclosure, all of other embodiments, made by the person skilled in the art without any creative efforts, fall into the scope of protection of the present disclosure.

Figure 2:
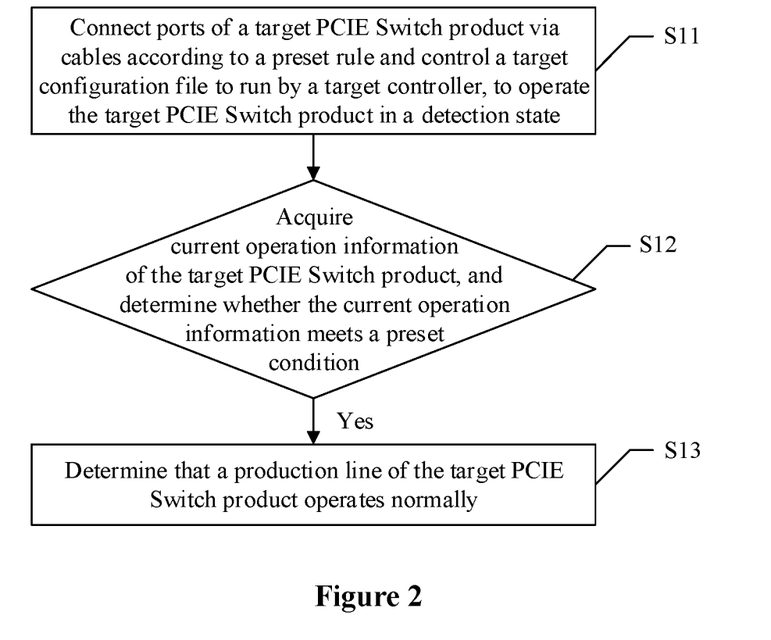
FIG. 2 is a flow chart of a method for detecting a production line of PCIE Switch products according to an embodiment of the present disclosure.

A method for detecting a production line of PCIE Switch products is provided according to an embodiment of the present disclosure. As shown in FIG. 2, the method includes the following steps S11 to S13.

In step S11, ports of a target PCIE Switch product are connected via cables according to a preset rule, and a target configuration file is controlled to run by a target controller, to operate the target PCIE Switch product in a detection state. The target configuration file is pre-stored in the target PCIE Switch product, and the target controller is connected to the target PCIE Switch product in advance.

It can be understood that, in order to detect the production line of the target PCIE Switch product, a pre-written target configuration file is loaded to the target PCIE Switch product, and the ports of the target PCIE Switch product are connected via the cables according to the preset rule, to run the target configuration file in the target PCIE Switch product.

It should be noted that, the target PCIE Switch product may meet different requirements by changing the target configuration file in a chip, that is, different application requirements may be met by configuring flexibly software. In the conventional technology, the target PCIE Switch product generally has 96 PCIE lines, which correspond to six X16 ports PCIE Port, namely a port port0, a port port1, a port port2, a port port3, a port port4 and a port port5. Each of the six ports is connected to two X8 Oculink connectors. In practice, the port port0 is an upstream port and is connected to a Host server, and the ports port1 to port5 are downstream ports and are connected to PCIE devices, such as Solid State Drives (SSD), Graphics Processing Units (GPU), and network cards. Generally, all the above listed components are assembled together, and an operation state of the target PCIE Switch product is acquired on the server side.

In this embodiment, with the target configuration file, each of the ports of the target PCIE Switch product may be set as an upstream port or a downstream port, and the ports of the target PCIE Switch product are connected via the cables according to the preset rule. By running the target configuration file, a PCIE link may be formed between connected ports, so that the target PCIE Switch product operates in the detection state.

In step S12, current operation information of the target PCIE Switch product is acquired, and it is determined whether the current operation information meets a preset condition.

In step S13, it is determined that a production line of the target PCIE Switch product operates normally if the current operation information meets the preset condition.

It is to be understood that in a case that the target PCIE Switch product operates in the detection state, the current operation information of the target PCIE Switch product is acquired by the target controller connected to the target PCIE Switch product. The current operation information of the target PCIE Switch product is compared with a preset condition, to determine whether a production line of the target PCIE Switch product operates normally.

Specifically, in practice, the target controller may communicate with the target PCIE Switch product via an I2C bus or a Uart bus, and acquire values in a register inside the target PCIE Switch product. In a case that the target PCIE Switch product operates in the detection state, the target controller may compare the value acquired from the register with a preset threshold. That is, if the current operating information of the target PCIE Switch product meets the preset condition, it is determined that the production line of the target PCIE Switch product operates normally.

As can been that, in this embodiment, a set target configuration file is loaded to the target PCIE Switch product in advance, and the target PCIE Switch product is connected to the target controller. The ports of the target PCIE Switch product are connected via the cables according to the preset rule. The target configuration file in the target PCIE Switch product is controlled to run by the target controller, to operate the target PCIE Switch product in the detection state. In a case that the target PCIE Switch product operates in the detection state, the current operation information of the target PCIE Switch product is acquired by the target controller. The current operation information of the target PCIE Switch product is compared with the preset condition, and it is determined that the production line of the target PCIE Switch product operates normally if a determination result meets the preset condition. In the conventional method, it is requires to connect the target PCIE Switch product to the server, and the target PCIE Switch product and the PCIE devices mounted thereon needs to be reassembled repeatedly, and it is required to detect whether the production line of the target PCIE Switch product operates normally under Bios or OS. Compared with the conventional method, with the method in the this embodiment, the efficiency of detecting the production line of the target PCIE Switch product can be greatly improved.

The technical solution of the present disclosure is optimized based on the above embodiment. Specifically, the above step S11 of connecting ports of a target PCIE Switch product via cables according to a preset rule includes:

connecting a port port0, a port port1, and a port port2 of the target PCIE Switch product respectively to a port port5, a port port4, and a port port3 of the target PCIE Switch product via the cables.

It can be understood that, in order to detect the production line of the target PCIE Switch product, it is required to form a PCIE link between ports of the target PCIE Switch product, in which case subsequent steps may be performed.

Figure 3:
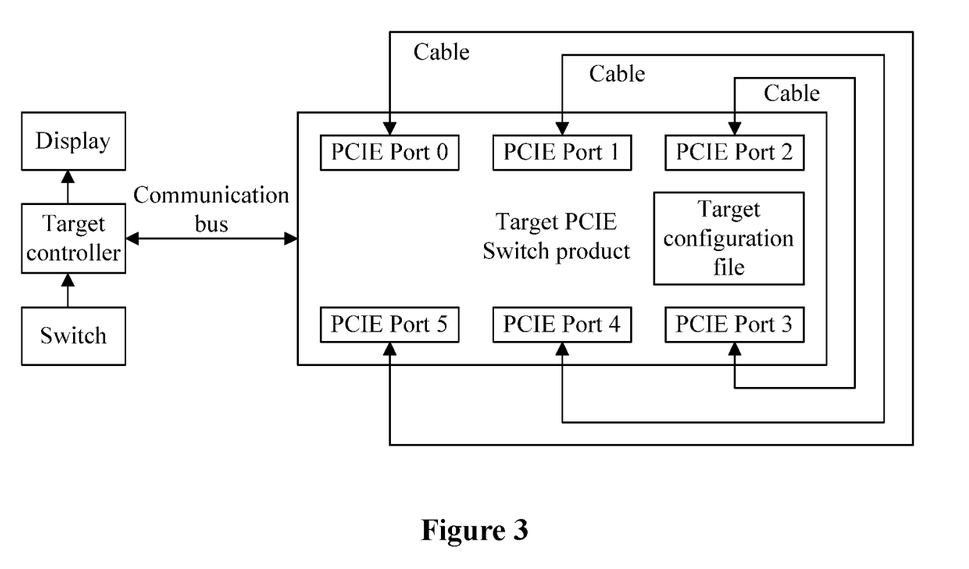
FIG. 3 is a schematic diagram illustrating a step of connecting ports of a PCIE Switch product according to an embodiment of the present disclosure.

Referring to FIG. 3, which is a schematic diagram illustrating a step of connecting ports of a PCIE Switch product according to an embodiment of the present disclosure. In this embodiment, the port port0 and the port port5 of the target PCIE Switch product are connected to each other via a cable, the port port1 and the port port4 of the target PCIE Switch product are connected to each other via a cable, and the port port2 and the port port3 of the target PCIE Switch product are connected to each other via a cable, to facilitate running the target configuration file. That is, by setting the target configuration file, the port port0, the port port1 and the port port2 of the target PCIE Switch may be set as downstream ports, to execute functions of a server. The port port3, the port port4 and the port port5 of the target PCIE Switch are set as upstream ports, to execute functions of a PCIE device. Apparently, with this connection arrangement, in a case that the target configuration file runs, a PCIE link is formed between the port port0 and the port port5, a PCIE link is formed between the port port1 and the port port4, and a PCIE link is formed between the port port2 and the port port3, so that subsequent steps may be performed.

In addition, the target controller may be connected to the target PCIE Switch product via a communication bus, and operates the target PCIE Switch product in the detection state. Then, a detection result is displayed by a display, to further improve the user experience.

The technical solution of the present disclosure is optimized based on the above embodiment. Specifically, the above step S11 of connecting ports of a target PCIE Switch product via cables according to a preset rule includes:

connecting the ports of the target PCIE Switch product via PCIE cables each with an Oculink connector according to the preset rule.

It can be understood that, the target PCIE Switch product may have different types and the ports of the target PCIE Switch product are different from each other, thus various connectors are used to connect the ports of the target PCIE Switch product. Specifically, in this embodiment, a PCIE cable with an Oculink connector is used to connect the ports of the target PCIE Switch product. However, a PCIE cable with a Slimline connector or a PCIE cable with a high-density connector may also be used to connect the ports of the target PCIE Switch product, which is not limited herein, as long as the PCIE cable can be used to connect the ports of the target PCIE Switch product.

The technical solution of the present disclosure is optimized based on the above embodiment. Specifically, the above step S13 of determining that a production line of the target PCIE Switch product operates normally includes:

determining that the production line of the target PCIE Switch product operates normally if the current operation information meets the preset condition, and controlling a target display to display according to a preset display rule, where the target display is arranged on the target PCIE Switch product in advance.

It can be understood that, in order to further improve the user experience, a display may be connected to the target controller to display a detection result on the production line of the target PCIE Switch product. In this embodiment, a red indicator light, a yellow indicator light, and a green indicator light are arranged on the target PCIE Switch product, to display the detection result of the target PCIE Switch product.

Figure 4:
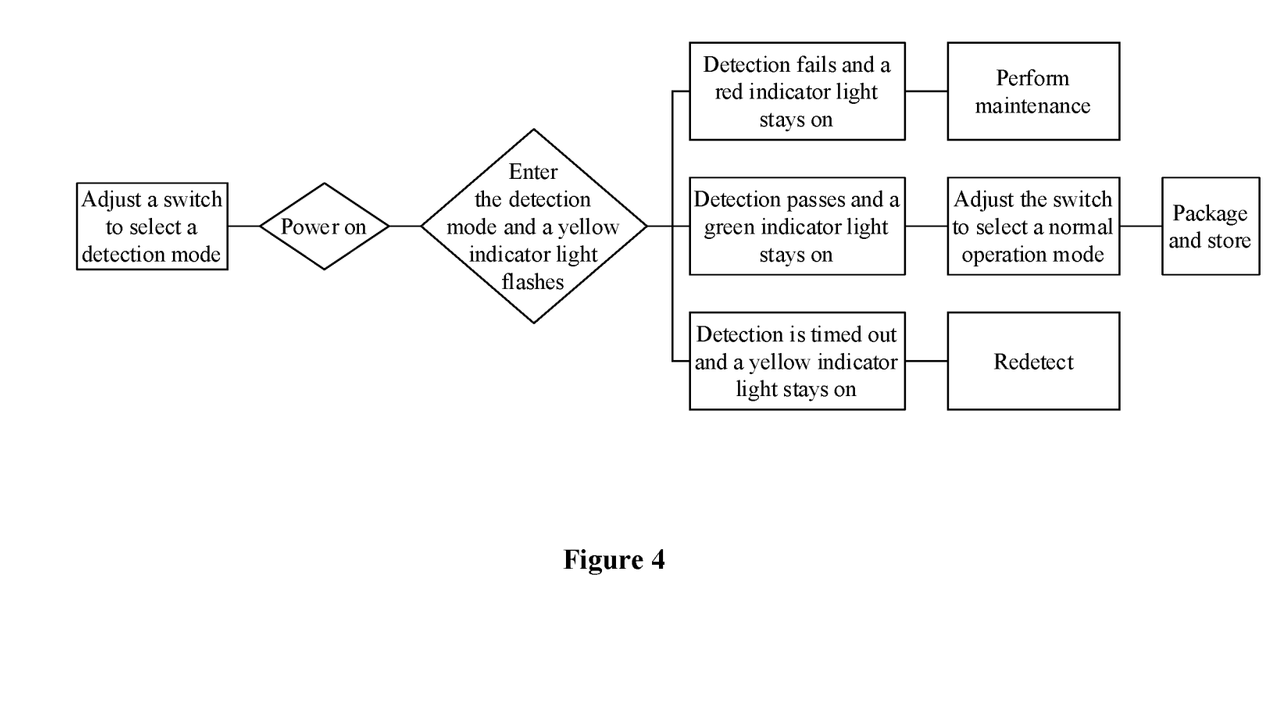
FIG. 4 is a schematic diagram illustrating a process of a target display for detecting a PCIE Switch product according to an embodiment of the present disclosure.

As shown in FIG. 4, specifically, in order to detect the target PCIE Switch product, the detection mode of the target PCIE Switch product is selected by adjusting a switch. Then the target PCIE Switch product is powered on and is started, so that the target PCIE Switch product operates in the detection mode. When the yellow indicator light of the display starts to flash, it is indicated that the target PCIE Switch product operates in the detection state. During the detection, if the detection fails, the red indicator light of the display may stay on, and then the target PCIE Switch product may be repaired by an operator. If the detection passes, the green indicator light of the display may stay on, and then a normal operation state can be selected by adjusting the switch, in which case it is indicated that the target PCIE Switch product is qualified, and then the target PCIE Switch product is packaged and is stored. If the yellow indicator light of the display stays on when the preset time period expires, it is indicated that the target PCIE Switch product operates abnormally during the detection, and it is required to detect the target PCIE Switch product again.

The technical solution of the present disclosure is optimized based on the above embodiment. Specifically, the above step S11 of controlling a target configuration file to run by a target controller, to operate the target PCIE Switch product in a detection state includes:

controlling the target configuration file to run by using a switch of the target controller, to operate the target PCIE Switch product in the detection state.

It can be understood that, in order to detect the production line of the target PCIE Switch product, the configuration file in the target PCIE Switch product is run firstly, to operate the target PCIE Switch product in the detection state. Specifically, in this embodiment, the target configuration file in the target PCIE Switch product is controlled to run via the switch of the target controller, to operate the target PCIE Switch product in the detection state. After the detection on the production line of the target PCIE Switch product is performed, the target configuration file may be controlled to stop running via the switch of the target controller, to operate the target PCIE Switch product in a normal operation mode.

Specifically, the switch is a physical switch or a software switch.

It can be understood that, in order to operate the target PCIE Switch product in the detection state, it is required to run the target configuration file by the target controller. Specifically, in this embodiment, the target PCIE Switch product is controlled to operate in the detection state via a physical switch or a software switch. If the physical switch is used to control to run the configuration file, an operator needs to be able to monitor the operation state of the physical switch in real time. If the software switch is used to control to run the target configuration file, the detection cost of the detection target PCIE Switch product may be reduced.

The technical solution of the present disclosure is optimized based on the above embodiment. Specifically, the above step S12 of acquiring current operation information of the target PCIE Switch product comprises:

acquiring a current connection state and/or a current bandwidth and/or a current rate of the target PCIE Switch product by the target controller.

Specifically, when the target PCIE Switch product is powered on, the port Port0 of the target PCIE Switch product functions as a server, and the port Port5 of the target PCIE Switch product functions as a PCIE device, so that the port Port0 of the target PCIE Switch product may communicate with the port Port5 of the target PCIE Switch product, and the current operation information of the target PCIE Switch product may be acquired by the target controller. Specifically, the current operation information of the target PCIE Switch product includes a current connection state and/or a current bandwidth and/or a current rate of the target PCIE Switch product.

Figure 5:
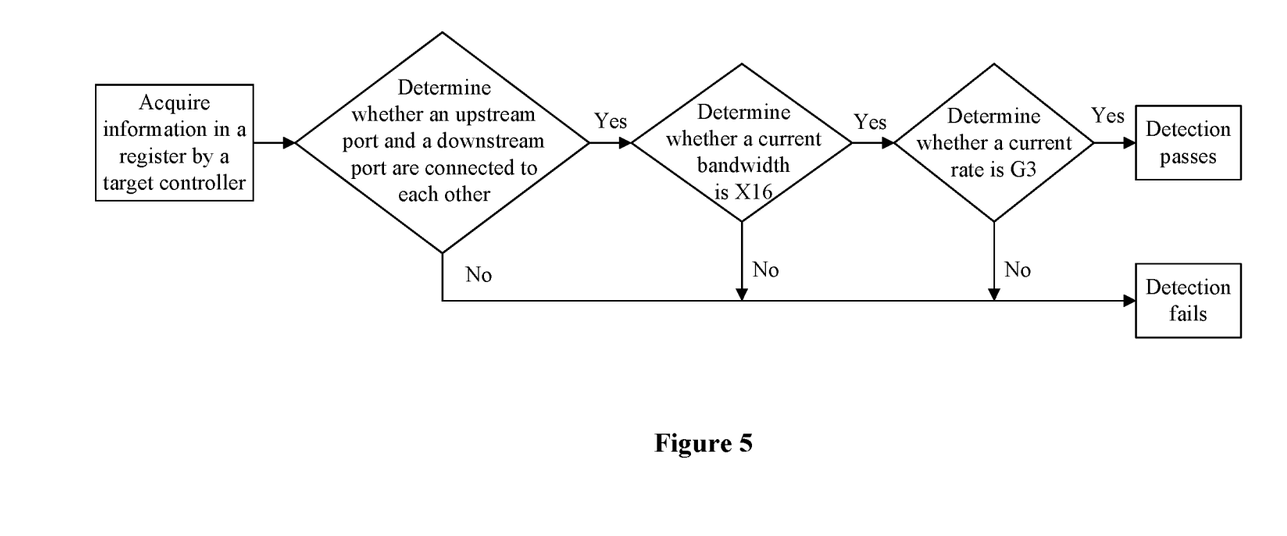
FIG. 5 is a schematic diagram illustrating a step of detecting a PCIE Switch product according to an embodiment of the present disclosure.

Referring to FIG. 5, during detection, in a case that the target controller acquires information in a register of the target PCIE Switch product, it may be determined whether a current upstream port and a current downstream port of the target PCIE Switch product are connected to each other based on the information in the register. If the current upstream port and the current downstream port of the target PCIE Switch product are connected to each other, it is determined whether a current bandwidth of the target PCIE Switch product is X16. If the current bandwidth is X16, it is determined whether a current rate of the target PCIE Switch product is G3. If the current rate is G3, the target PCIE Switch product passes the detection, which indicates that the production line of the target PCIE Switch product is qualified. If any one of the above conditions does not meet the detection condition, the target PCIE Switch product does not pass the detection, which indicates that the target PCIE Switch product is not qualified.

Figure 6:
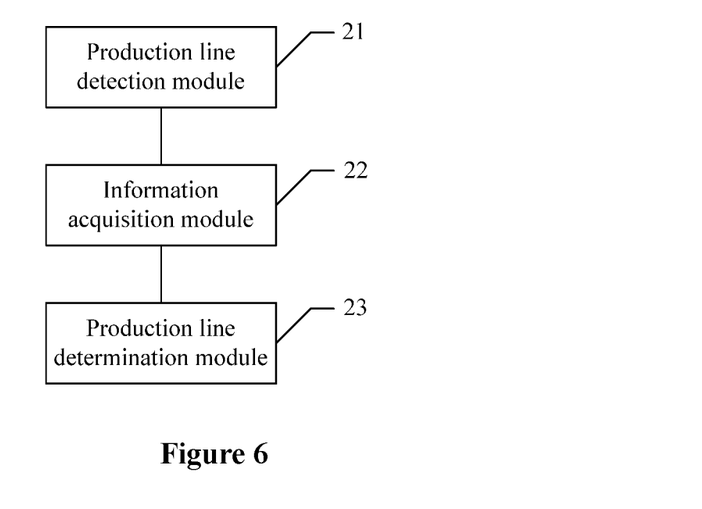
FIG. 6 is a structural diagram of a system for detecting a production line of PCIE Switch products according to an embodiment of the present disclosure.

Correspondingly, a system for detecting a production line of PCIE Switch products is further provided according to the present disclosure. As shown in FIG. 6, the system includes: a production line detection module 21, an information acquisition module 22 and a production line determination module 23. The production line detection module 21 is configured to connect ports of a target PCIE Switch product via cables according to a preset rule, and control a target configuration file to run by a target controller, to operate the target PCIE Switch product in a detection state, where the target configuration file is pre-stored in the target PCIE Switch product, and the target controller is connected to the target PCIE Switch product in advance. The information acquisition module 22 is configured to acquire current operation information of the target PCIE Switch product, and determine whether the current operation information meets a preset condition. The production line determination module 23 is configured to determine that a production line of the target PCIE Switch product operates normally if the current operation information meets the preset condition.

Preferably, the production line detection module 21 includes a port connection unit configured to connect a port port0, a port port1, and a port port2 of the target PCIE Switch product respectively to a port port5, a port port4, and a port port3 of the target PCIE Switch product via the cables.

Preferably, the production line detection module 21 includes a cable selection unit configured to connect the ports of the target PCIE Switch product via PCIE cables each with an Oculink connector according to the preset rule.

Preferably, the production line determination module 23 includes a production line determination unit configured to determine that the production line of the target PCIE Switch product operates normally if the current operation information meets the preset condition, and control a target display to display according to a preset display rule, where the target display is arranged on the target PCIE Switch product in advance.

Preferably, the production line detection module 21 includes a production line detection unit configured to control the target configuration file to run by using a switch of the target controller, to operate the target PCIE Switch product in the detection state.

Preferably, the information acquisition module 22 includes an information acquisition unit configured to: acquire a current connection state and/or a current bandwidth and/or a current rate of the target PCIE Switch product by the target controller.

Correspondingly, a computer-readable storage medium is further provided according to the present disclosure. The computer-readable storage medium includes a computer program stored thereon, and when the computer program is executed by a processor, steps of the method for detecting a production line of PCIE Switch products are performed.

Figure 7:
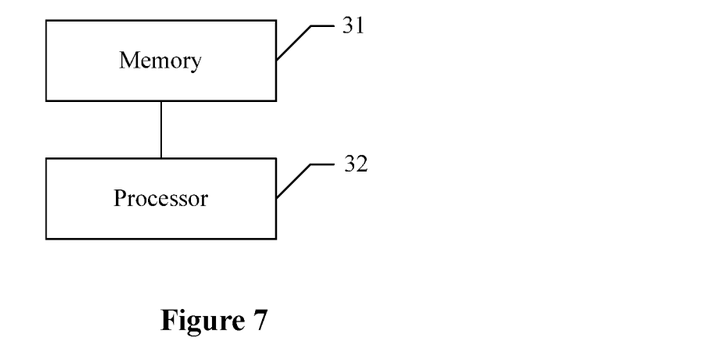
FIG. 7 is a structural diagram of a device for detecting a production line of PCIE Switch products according to an embodiment of the present disclosure.

Correspondingly, a device for detecting a production line of PCIE Switch products is further provided according to the present disclosure. As shown in FIG. 7, the device includes:

a memory 31 configured to store a computer program; and a processor 32 configured to execute the computer program to perform the steps of the method for detecting a production line of PCIE Switch products.

The above embodiments in the specification are described in a progressive manner. Each of the embodiments is mainly focused on describing its differences from other embodiments, and references may be made among these embodiments with respect to the same or similar portions among these embodiments. Descriptions of the apparatus disclosed in the embodiments are simple since the apparatus corresponds to the method disclosed in the embodiments, and related explanations can be found in descriptions of the method.

The person skilled in the art can further appreciate that the elements and algorithm steps of each embodiment described in connection with the embodiments disclosed herein can be implemented in electronic hardware, computer software or a combination of both, in order to clearly illustrate the interchangeability of the hardware and software, the composition and steps of the various examples have been generally described in terms of function in the above description. Whether these functions are performed in hardware or software depends on the specific application and design constraints of the technical solution. The person skilled in the art can use different methods for implementing the described functions for each particular application; such implementation should not be considered to be beyond the scope of the present disclosure.

The steps of the method or algorithm described in the embodiments disclosed herein may be implemented directly by hardware, software modules executed by a processor, or a combination of both. Software modules can be placed in a random access memory (RAM), a memory, a read-only memory (ROM), an electrically programmable ROM, an electrically erasable and programmable ROM, a register, a hard disk, a removable disk, a CD-ROM, or any other known storage medium in the field of technology.

It should be further noted that, the relationship terminologies such as "first", "second" and the like are only used herein to distinguish one entity or operation from another, rather than to necessitate or imply that the actual relationship or order exists between the entities or operations. Further, the term "include", "comprise" or any variant thereof is intended to encompass nonexclusive inclusion so that a process, method, article or device including a series of elements includes not only those elements but also other elements which have not been listed definitely or an element(s) inherent to the process, method, article or device. Moreover, the expression "comprising a(n)" in which an element is defined will not preclude presence of an additional identical element(s) in a process, method, article or device comprising the defined element(s) unless further defined.

The method, the system and the device for detecting a production line of PCIE Switch products and a medium according to the present disclosure are described in detail in the above. The present disclosure is described by specific embodiments in the specification. The above description for embodiments is only for helping to understand the method and system of the present disclosure. For those skilled in the art, modification can be made to the specific embodiments and the application scopes based on the concept of the present disclosure, as described above, the specification should not be considered as limiting the present disclosure.

The invention claimed is:

1. A method for detecting a production line of PCIE Switch products, comprising:

connecting ports of a target PCIE Switch product via cables according to a preset rule, wherein the preset rule indicates connecting a port port0, a port port1, and a port port2 of the target PCIE Switch product respectively to a port port5, a port port4, and a port port3 of the target PCIE Switch product;

controlling a target configuration file to run by a target controller, to operate the target PCIE Switch product in a detection state, wherein the target configuration file is pre-stored in the target PCIE Switch product, and the target controller is connected to the target PCIE Switch product in advance;

acquiring current operation information of the target PCIE Switch product, and determining whether the current operation information meets a preset condition, wherein the current operation information comprises a current connection state, a current bandwidth and a current rate of the target PCIE Switch product, and the preset condition indicates that the ports of the target PCIE Switch product are connected according to the preset rule, and the current bandwidth and the current rate of the target PCIE Switch product respectively reach a preset bandwidth threshold and a preset rate threshold; and determining that a production line of the target PCIE Switch product operates normally if the current operation information meets the preset condition.

2. The method according to claim 1, wherein the connecting ports of a target PCIE Switch product via cables according to a preset rule comprises:

connecting the ports of the target PCIE Switch product via PCIE cables each with an Oculink connector according to the preset rule.

3. The method according to claim 1, wherein the determining that a production line of the target PCIE Switch product operates normally if the current operation information meets the preset condition comprises:

determining that the production line of the target PCIE Switch product operates normally if the current operation information meets the preset condition, and controlling a target display to display according to a preset display rule, wherein the target display is arranged on the target PCIE Switch product in advance.

4. The method according to claim 1, wherein the controlling a target configuration file to run by a target controller, to operate the target PCIE Switch product in a detection state comprises:

controlling the target configuration file to run by using a switch of the target controller, to operate the target PCIE Switch product in the detection state.

5. The method according to claim 4, wherein the switch is a physical switch or a software switch.

6. A non-transitory computer-readable storage medium comprising a computer program stored thereon, wherein the computer program, when being executed by a processor, causes the processor to perform steps of the method for detecting a production line of PCIE Switch products according to claim 1.

7. A device for detecting a production line of PCIE Switch products, comprising:

a memory configured to store a computer program; and
a processor configured to execute the computer program to perform steps of a method for detecting a production line of PCIE Switch products, wherein the method for detecting a production line of PCIE Switch products comprising:

connecting ports of a target PCIE Switch product via cables according to a preset rule, wherein the preset rule indicates connecting a port port0, a port port1, and a port port2 of the target PCIE Switch product respectively to a port port5, a port port4, and a port port3 of the target PCIE Switch product;

controlling a target configuration file to run by a target controller, to operate the target PCIE Switch product in a detection state, wherein the target configuration file is pre-stored in the target PCIE Switch product, and the target controller is connected to the target PCIE Switch product in advance;

acquiring current operation information of the target PCIE Switch product, and determining whether the current operation information meets a preset condition, wherein the current operation information comprises a current connection state, a current bandwidth and a current rate of the target PCIE Switch product, and the preset condition indicates that the ports of the target PCIE Switch product are connected according to the preset rule, and the current bandwidth and the current rate of the target PCIE Switch product respectively reach a preset bandwidth threshold and a preset rate threshold; and determining that a production line of the target PCIE Switch product operates normally if the current operation information meets the preset condition.

\* \* \* \* \*